US012493455B2

(12) United States Patent
Von Der Heiden

(10) Patent No.: US 12,493,455 B2
(45) Date of Patent: Dec. 9, 2025

(54) CONTAINER BASED GENERATION OF INPUTS FOR GENERIC FUNCTIONS

(71) Applicant: MICRO FOCUS LLC, Santa Clara, CA (US)

(72) Inventor: Markus Rainer Von Der Heiden, Austin, TX (US)

(73) Assignee: Micro Focus LLC, Santa Clara, CA (US)

( * ) Notice: Subject to any disclaimer, the term of this patent is extended or adjusted under 35 U.S.C. 154(b) by 53 days.

(21) Appl. No.: 17/670,205

(22) Filed: Feb. 11, 2022

(65) Prior Publication Data

US 2023/0259347 A1    Aug. 17, 2023

(51) Int. Cl.
G06F 8/61    (2018.01)
(52) U.S. Cl.
CPC .................................. G06F 8/63 (2013.01)
(58) Field of Classification Search
CPC ...................................................... G06F 8/63
USPC ................. 717/106–109, 174–178
See application file for complete search history.

(56) References Cited

U.S. PATENT DOCUMENTS

| 10,360,011 B2 * | 7/2019 | Acharya | G06F 9/45558 |
| 10,789,368 B2 * | 9/2020 | Adam | G06F 21/564 |
| 2014/0096025 A1 * | 4/2014 | Mandel | H04L 67/10 |
| | | | 715/739 |
| 2017/0277524 A1 * | 9/2017 | Bhat | G06F 8/60 |
| 2019/0243628 A1 * | 8/2019 | Goldmann | G06F 16/188 |
| 2020/0210217 A1 * | 7/2020 | Jeon | H04L 67/61 |
| 2021/0124610 A1 * | 4/2021 | Gardner | G06F 8/63 |
| 2021/0382728 A1 * | 12/2021 | Chan | G06F 9/5027 |
| 2022/0171863 A1 * | 6/2022 | Green | G06F 21/87 |

FOREIGN PATENT DOCUMENTS

| CN | 108369622 A | * | 8/2018 | G06F 21/44 |
| CN | 113721990 A | * | 11/2021 | |

OTHER PUBLICATIONS

Han et al., "Container Image Access Control Architecture to Protect Applications", 2020, IEEE Access, vol. 8, pp. 162012-162020. (Year: 2020).*

* cited by examiner

Primary Examiner — Ted T. Vo
(74) Attorney, Agent, or Firm — Sheridan Ross P.C.

(57) ABSTRACT

According to examples, an apparatus may include a processor and a memory on which are stored machine-readable instructions that when executed by the processor cause the processor to create a container in a container runtime environment. The container may include a plurality of generic functions for installation of an application on a computing device. The processor may receive configuration information correlated to the installation of the application. The configuration information may be correlated to a function among the plurality of generic functions. The processor may generate an input for the correlated function based on the configuration information. The correlated function may execute at the computing device based on the generated input. Based on results of an execution of the correlated function at the computing device, the processor may output a log of the correlated function.

20 Claims, 7 Drawing Sheets

CONTAINER BASED GENERATION OF INPUTS FOR GENERIC FUNCTIONS

BACKGROUND

Applications may be installed on computing devices. The computing devices may be implemented on various types of platforms and configurations. In some examples, compatibility issues between the applications to be installed and the computing devices may be manually addressed during installation.

BRIEF DESCRIPTION OF THE DRAWINGS

Features of the present disclosure are illustrated by way of example and not limited in the following figure(s), in which like numerals indicate like elements, in which.

DETAILED DESCRIPTION

Figure 1:
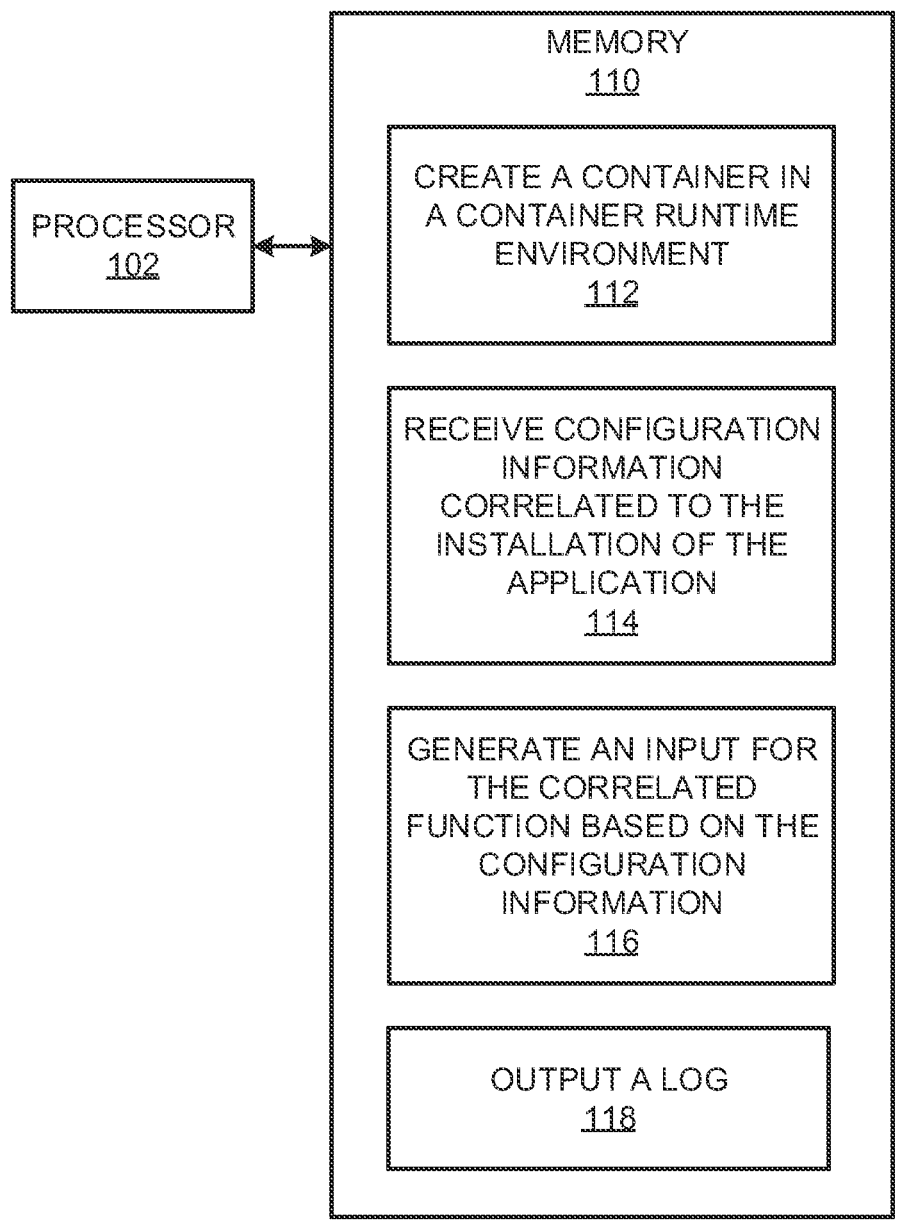
FIG. 1 shows a block diagram of an example apparatus that may create a container, which may receive configuration information correlated to a correlated function for installation of an application on a computing device, and generate an input for the correlated function based on the received configuration information to execute the correlated function at the computing device.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Generally, applications may be installed on one or more target devices. Installation projects, which may include installation of multiple applications or software packages, may include multiple installation steps, multiple applications, multiple target devices, and/or the like, which may increase the relative complexity of the installation projects. In many instances, a manual step-by-step installation or a workflow engine may be used to carry out the installation. A concern associated with such methods may be that manual installations may run into issues caused by unknown or incorrectly configured target environments, which may consume a relatively large amount of human resources and time to address manually. In some instances, a workflow engine based installation methods may leave a relatively large footprint at the target devices, which may be needed to carry out the installation. For instance, a persistent application server may be needed to provide certain installation services, such as automation of installation steps, which may consume a relative large amount of resources at the target devices.

Disclosed herein are methods, apparatuses, and computer-readable mediums that may enable automated installation of applications using a container based framework. In some examples, a processor may create a container in a container runtime environment. The container may include a plurality of generic functions that may be customized for a particular installation. In some examples, the processor may receive configuration information correlated to the installation of the application. The configuration information may be correlated to a function among the plurality of generic functions. The processor may generate an input for the correlated function based on the configuration information to customize the generic function. Based on results of an execution of the correlated function at the computing device, the processor may output a log of the correlated function. In some examples, the control container may manage operation of the plurality of containers in a multi-thread mode, in which the plurality of the containers may connect to a respective target computing device in parallel.

By enabling a processor to execute steps of an application installation using containers, which may include generic functions and configuration files to customize the generic functions, the installation may be platform independent and product agnostic. Implementation of containers, which may allow for temporary, non-persistent use of resources since the containers may be created and deleted upon completion of their respective tasks, may reduce a size of the footprint needed at the target device to carry out the installation. Automated execution of installation steps may also reduce potential delays and human errors associated with manual installation of applications including identification of issues due to unknown target environments, such as incorrectly set up target resources, thereby reducing downtime. The implementation of the features of the present disclosure may also enhance efficiency of the processor and may reduce overall installation times by enabling a multi-thread mode for the installation, which may reduce consumption of energy and computing resources by the processor.

Figure 2:
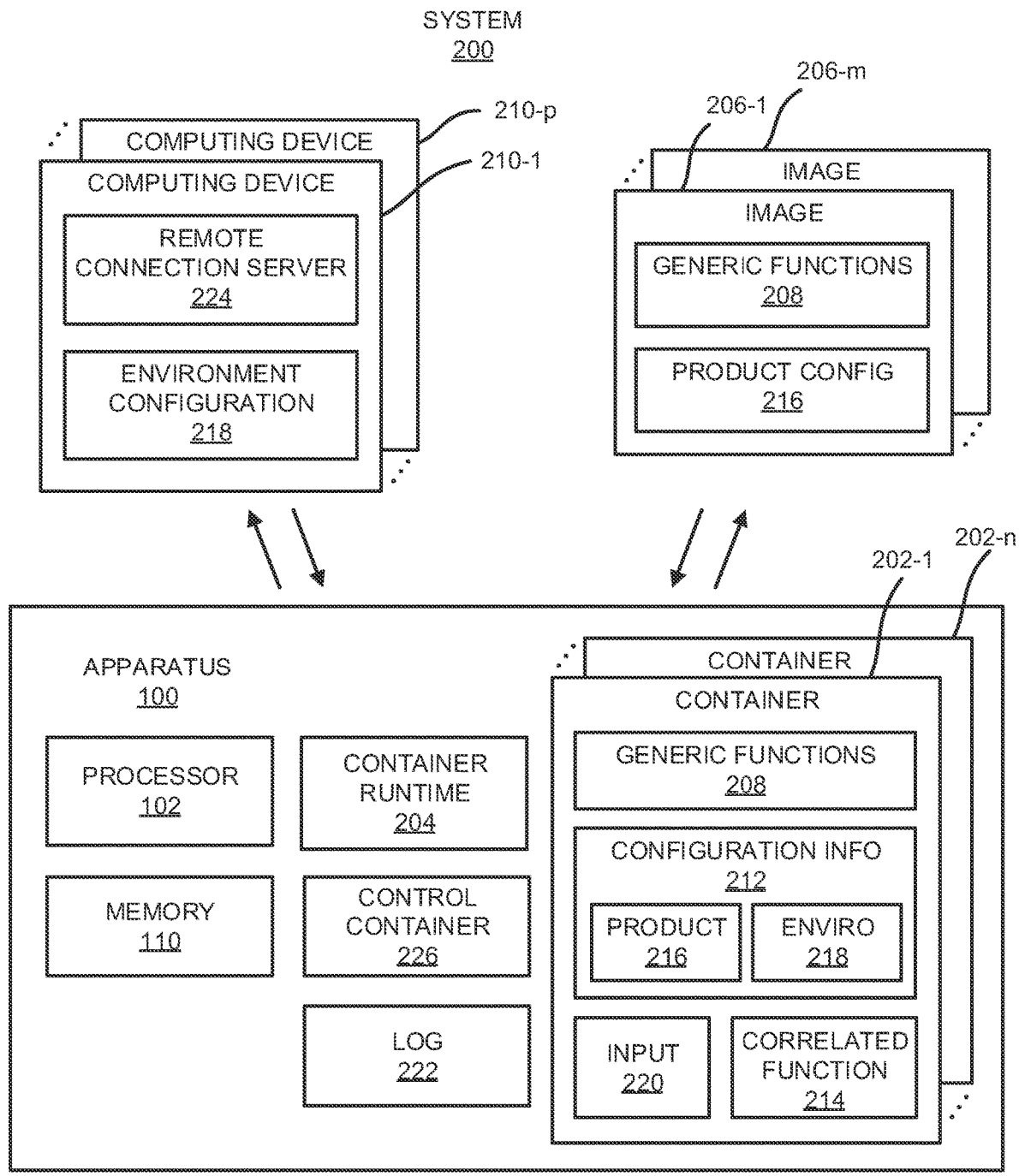
FIG. 2 shows a block diagram of an example system in which the example apparatus depicted in FIG. 1 may be implemented.

Reference is made to FIGS. 1 and 2. FIG. 1 shows a block diagram of an example apparatus 100 that may create a container 202-1 to 202-*n*, which may receive configuration information 212 correlated to a correlated function 214 for installation of an application on a computing device 210-1 to 210-*p*, and generate an input 220 for the correlated function 214 based on the received configuration information 212 to execute the correlated function 214 at the computing device 210-1 to 210-*p*. FIG. 2 shows a block diagram of an example system 200 in which the example apparatus 100 depicted in FIG. 1 may be implemented. It should be understood that the example apparatus 100 depicted in FIG. 1 and the example system 200 depicted in FIG. 2 may include additional features and that some of the features described herein may be removed and/or modified without departing from the scopes of the apparatus 100 and/or the system 200.

The apparatus 100 may be a server (such as a management server), a node in a network (such as a data center), a personal computer, a laptop computer, a tablet computer, a smartphone, and/or the like. As shown, the apparatus 100 may include a processor 102 and a memory 110, e.g., a non-transitory computer-readable medium. In some examples, the apparatus 100 may be a management server in a cloud-based management platform that has stored thereon instructions that may cause the processor 102 to execute discovery processes to discover network configuration information on multiple cloud platforms.

The processor 102 may be a semiconductor-based microprocessor, a central processing unit (CPU), an application specific integrated circuit (ASIC), a field-programmable gate array (FPGA), and/or other hardware device. Although the apparatus 100 is depicted as having a single processor 102, it should be understood that the apparatus 100 may include additional processors and/or cores without departing from a scope of the apparatus 100. In this regard, references to a single processor 102 as well as to a single memory 110 may be understood to additionally or alternatively pertain to multiple processors 102 and/or multiple memories 110.

The memory 110 may be an electronic, magnetic, optical, or other physical storage device that contains or stores executable instructions. The memory 110 may be, for example, Read Only Memory (ROM), flash memory, solid state drive, Random Access memory (RAM), an Erasable Programmable Read-Only Memory (EPROM), an Electrically Erasable Programmable Read-Only Memory (EEPROM), a storage device, an optical disc, or the like. The memory 110 may be a non-transitory computer-readable medium. The term "non-transitory" does not encompass transitory propagating signals.

As shown, the memory 110 may have stored thereon instructions 112-118 that the processor 102 may fetch, decode, and execute. Particularly, the processor 102 may execute the instructions 112-118 to create and run a container 202 for installation of an application at a target device. The instructions 112-118 may be non-transitory machine-readable instructions (or equivalently, non-transitory computer-readable instructions).

The processor 102 may fetch, decode, and execute the instructions 112 to create containers 202-1 to 202-*n* in a container runtime environment, for instance, in a container runtime 204. The containers 202-1 to 202-*n* may be runnable instances of respective images, such as images 206-1 to 206-*m*. The processor 102 may create each of the containers 202-1 to 202-*n* based on respective images 206-1 to 206-*m*.

In some examples, the processor 102 may create, start, stop, move, or delete the containers 202-1 to 202-*n* in the container runtime 204. For instance, the processor 102 may create the containers 202-1 to 202-*n* using images 206-1 to 206-*m*. In some instances, the processor 102 may start execution of one or more than one of the containers 202-1 to 202-*n* based on need, for instance, based on a predefined installation sequence that may call for a particular container 202-1 to 202-*n* at a particular point during the predefined installation sequence. The processor 102 may stop execution of the containers 202-1 to 202-*n* once the containers 202-1 to 202-*n* are no longer needed, in which case the container data may be preserved so that the containers 202-1 to 202-*n* may be re-started. In some instances, the processor 102 may delete the containers 202-1 to 202-*n*, in which case all data for the containers 202-1 to 202-*n* may be deleted. In some examples, the containers 202-1 to 202-*n* may be connected to one or more networks, attached to a storage device, and/or the like.

The images 206-1 to 206-*m* may be read-only templates with instructions for creating containers 202-1 to 202-*n*. Each of the images 206-1 to 206-*m* may include some customization for respective ones of containers 202-1 to 202-*n*.

In some examples, the images 206-1 to 206-*m* may include a plurality of generic functions 208. For instance, the images 206-1 to 206-*m* may have predefined sets of generic functions 208 suited for particular steps of an installation of an application. As used herein, the term "installation" may include different aspects or steps of services to install and/or manage applications including, for instance, a simulation step to simulate various steps of the installation, an install step, an uninstall step, an update step, a migrate step, an integrate step, a test step, and/or the like.

The plurality of generic functions 208 included in the containers 202-1 to 202-*n* may be platform independent, and may be customizable for a particular application, a particular target environment, a particular step of an installation, and/or the like. The generic functions 208 for the container 202-1 may include predefined functions to perform various steps or actions during an installation of an application.

The plurality of generic functions 208 may be generic to various applications, various target platforms, and/or the like. The processor 102 may customize the plurality of generic functions 208 to a particular application and/or a target environment in order to perform the correlated steps of the installation at the target device.

By way of particular example and for purposes of illustration, the container 202-1 may be a simulator container, which may simulate various steps of an installation. The generic functions 208 included in this container 202-1, as well as the correlated image 206-1, may be a predefined set of generic functions that may be specific to performing the simulation of the installation.

In another particular example, the plurality of generic functions 208 may include generic functions to check whether a version of an application to be installed is already installed on a target device, determine a status of the target device, identify a file system of the target device, and/or the like. The plurality of generic functions 208 may be customized for a particular installation, for instance, for a particular application, a particular action to be performed during the installation, such as install, uninstall, update, migrate, and/or the like, a particular target device, a particular target environment, and/or the like.

The processor 102 may fetch, decode, and execute the instructions 114 to receive configuration information 212 correlated to the installation of the application at a target device, for instance, computing devices 210-1 to 210-$p$. The configuration information 210 may be correlated to a predefined function or a predefined group of functions among the plurality of generic functions 208. The configuration information 210 may include information to customize the correlated function 214 among the plurality of generic functions 208 to the installation, for instance to a particular application, an environment of the target device, a type of installation operation, and/or the like.

In some examples, the configuration information 212 may include product configuration information ("Product") 216 and environment configuration information ("Enviro") 218. The product configuration information 216 may be based on a configuration of the application. The product configuration information 216 may include information to select and customize the correlated function 214 among the plurality of generic functions 208 based on the installation of the application. In some examples, the product configuration information 216 may include information for predefined steps for installing a particular application, a predefined set of prerequisites, such as the required operating system, requisite hardware resources, and/or the like for the particular application.

In some examples, the product configuration information 216 may be stored in the image 206-1 to 206-$m$. In these instances, the processor 102 may load the product configuration information 216 into the container 202-1 to 202-$n$ when the container 202-1 to 202-$n$ is created. Alternatively or additionally, the product configuration information 216 may be stored in a data store (not shown), a server (not shown), and/or the like. In these instances, the processor 102 may receive or retrieve the product configuration information 216 from the data store, and may load the received information at the container 202-1 to 202-$n$.

The environment configuration information 218 may be based on an environment of the computing devices 210-1 to 210-$p$. For instance, the computing devices 210-1 to 210-$p$ may each include a remote connection server 224, and the environment configuration information 218 may include a configuration of the remote connection server 224. In some examples, the computing devices 210-1 to 210-$p$ may store the environment configuration information 218. Alternatively or additionally, the environment configuration information 218 may be stored in a data store (not shown) that may be separate from the computing device 210-1 to 210-$p$, on a server (not shown), and/or the like.

The environment configuration information 218 may include attributes of the computing devices 210-1 to 210-$p$. The attributes included in the environment configuration information 218 may be used to customize the correlated function 214 to particular environments of the computing devices 210-1 to 210-$p$. In some examples, the attributes of the environment configuration information 218 may include names of the computing devices 210-1 to 210-$p$, Internet Protocol (IP) addresses of the computing devices 210-1 to 210-$p$, authentication information, for instance, a username and a password, a certificate, and/or the like, hardware configuration, type of operating system (OS), OS version, and/or the like.

The processor 102 may fetch, decode, and execute the instructions 116 to generate an input 220 for the correlated function 214 based on the configuration information 212. By way of particular example, the processor 102 may customize the correlated function 214 for a particular computing device, such as the computing device 210-1, based on the configuration information 212. The processor 102 may execute the correlated function 214 at the computing device 210-1 based on the generated input 220.

In some examples, the product configuration information 216 may include placeholders for the attributes of the computing devices 210-1 to 210-$p$. The processor 102 may insert values for the attributes of the computing devices 210-1 to 210-$p$ obtained from the environment configuration information 218 to correlated placeholders for the attributes in the product configuration information 216 to generate the input 220 for the correlated function 214.

By way of particular example and for purposes of illustration, the product configuration information 216 may be correlated to a function to log into a target device, for instance, the computing device 210-1. The product configuration information 216 may identify the correlated function 214, among the plurality of generic functions 208, which may be used to log into the computing device 210-1. The product configuration information 216 may include placeholders for attributes of the computing device 210-1, such as a name of the computing device 210-1, an IP address, authentication information, and/or the like.

The processor 102 may access the attributes for the computing device 210-1 from the received environment configuration information 218 for the computing device 210-1. The processor 102 may insert values for the attributes of the computing device 210-1 at correlated placeholders for the attributes in the product configuration information 216 to generate the input 220 for the correlated function 214.

The processor 102 may fetch, decode, and execute the instructions 118 to output a log 222 of the correlated function 214. The processor 102 may cause the correlated function 214 to be executed at the computing device 210-1 to 210-$p$, and based on the execution of the correlated function 214, the processor 102 may output the log 222 for the correlated function 214. In some examples, the container 202-1 may establish a connection to a target device for the correlated function 214, for instance, the computing device 210-1. The container 202-1 may cause the computing device 210-1 to execute the correlated function 214 based on the input 220. The container 202-1 may receive results based on the execution of the correlated function 214, and may write the received results into the log 222. In some examples, the log 222 may be stored in at the computing device 210-1, a data store (not shown), a server (not shown), and/or the like.

In some examples, the processor 102 may create a control container 226 to manage the installation of the application on the computing devices 210-1 to 210-$p$. The control container 226 may manage the plurality of containers 202-1 to 202-$n$, for instance, to create, start, stop, migrate, delete the containers 202-1 to 202-$n$, and/or the like. In some examples, the control container 226 may manage each of the plurality of containers 202-1 to 202-$n$ to perform a predefined step among a plurality of predefined steps of the installation of the application at the computing devices 210-1 to 210-$p$.

In some examples, the control container 226 may manage operation of the plurality of containers 202-1 to 202-$n$ in a multi-thread mode, in which the plurality of containers 202-1 to 202-$n$ may connect to multiple target devices. In some examples, the plurality of the containers 202-1 to 202-$n$ may connect to a respective target computing device, among the computing devices 210-1 to 210-$p$, in parallel or in a predefined sequence.

In some examples, the control container 226 may create or start the plurality of the containers 202-1 to 202-$n$ in parallel or in a predefined sequence to perform the predefined steps of the installation for the application. In some examples, the plurality of containers 202-1 to 202 to perform the predefined steps of the installation may include a simulator container to simulate the installation, an install container to install the application, an uninstall container to uninstall the application, an update container to update the application, a migrate container to migrate the application to another computing device, an integrate container to integrate the computing device to the application, and/or the like.

Figure 3:
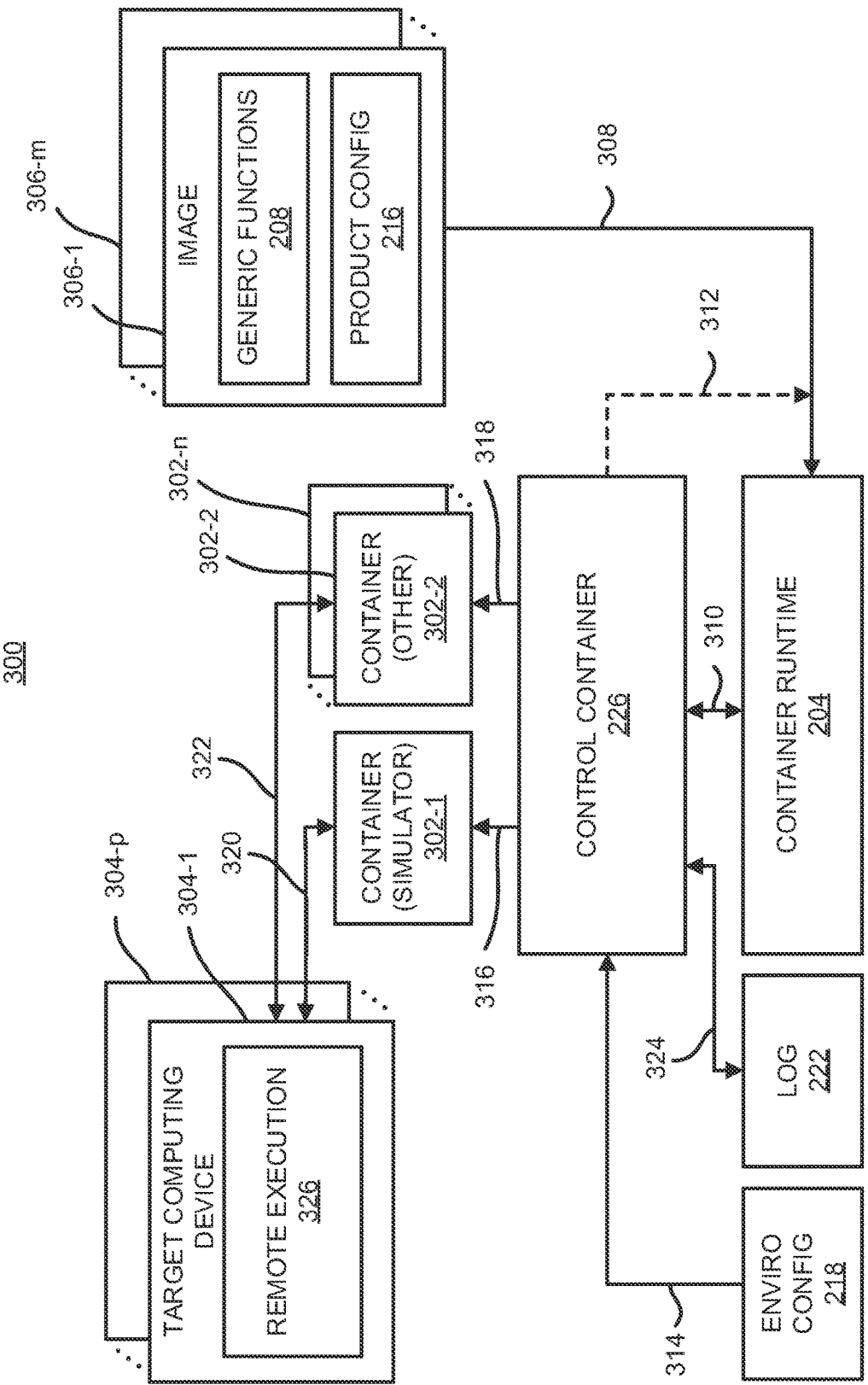
FIG. 3 shows a process diagram of an example operation of the control container depicted in FIG. 2 to control a simulator container and a plurality of containers to perform predefined steps during installation of applications on target computing devices.
Figure 4:
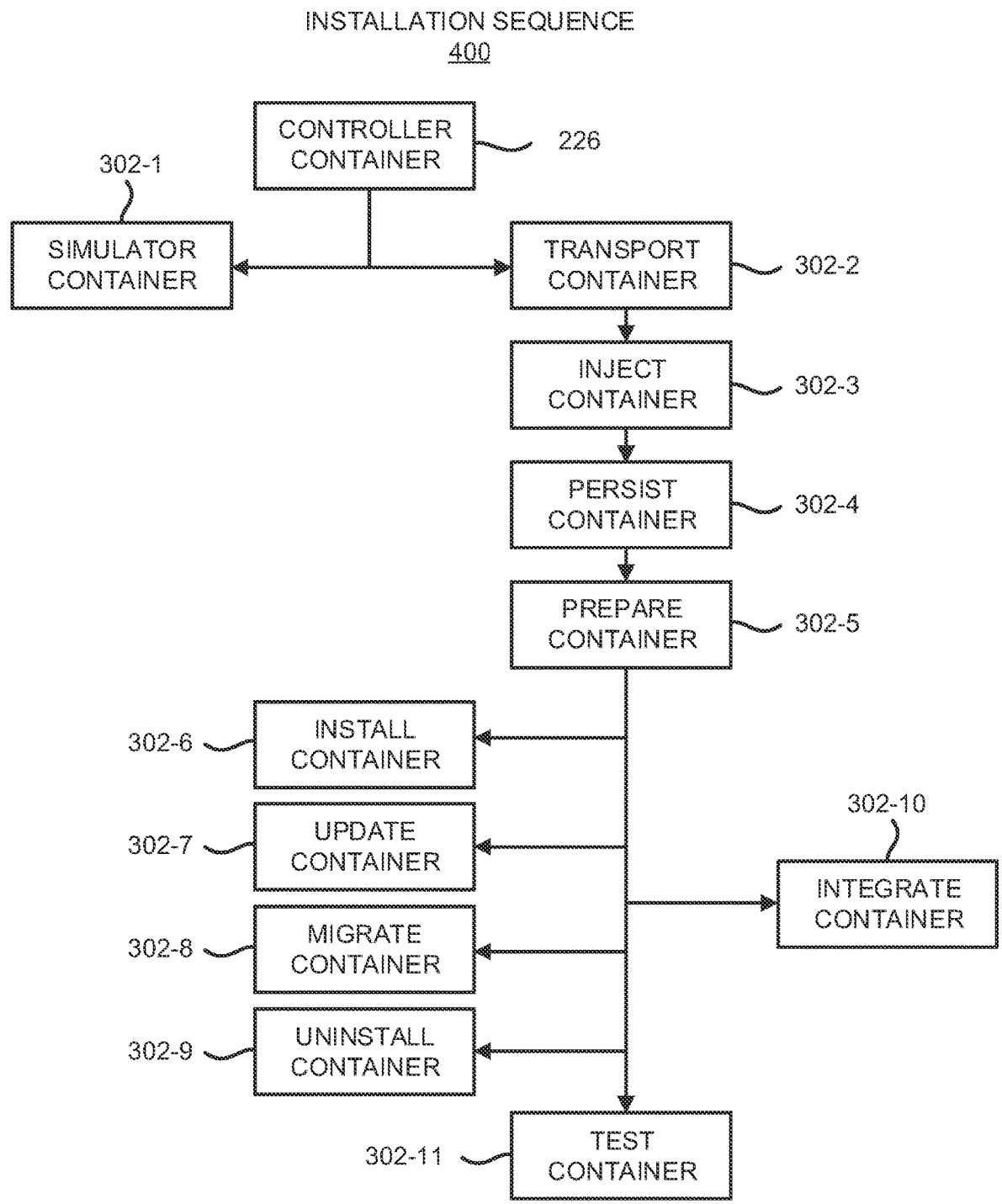
FIG. 4 shows a sequence diagram of an example installation sequence by which the control container depicted in FIG. 3 may manage a plurality of containers for installing applications on target computing devices.
Figure 5:
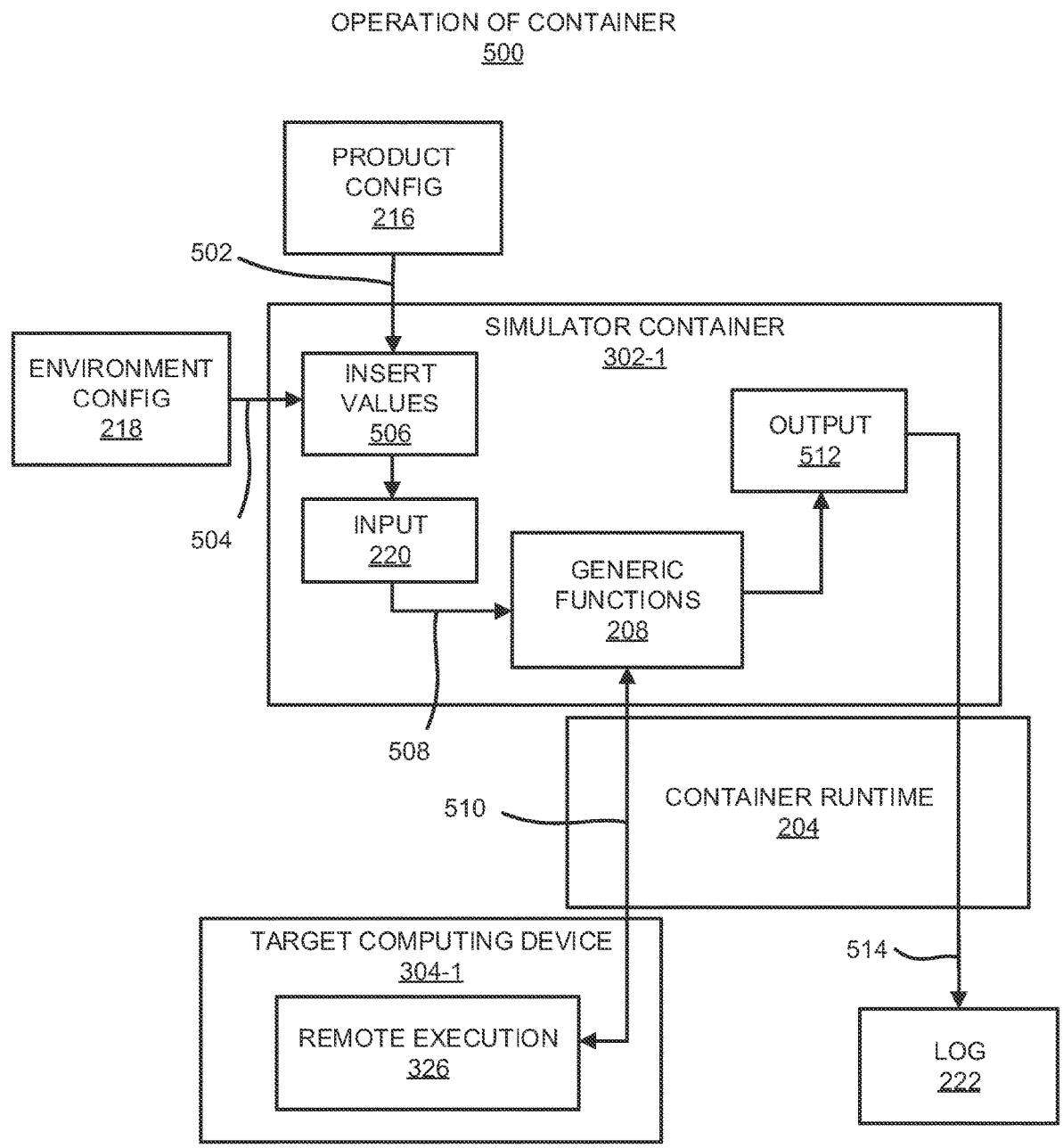
FIG. 5 shows a process diagram of an example operation of a container depicted in FIG. 3 that may have a plurality of generic functions, in which the container may generate an input for a function among the plurality of generic functions based on product configuration information and environmental configuration information, and may output a log based on execution of the function at a target computing device.

Reference is made to FIGS. 3, 4, and 5. FIG. 3 shows a process diagram of an example operation 300 of the control container 226 depicted in FIG. 2 to control a simulator container 302-1 and a plurality of containers 302-2 to 302-n to perform predefined steps during installation of applications on target computing devices 304-1 to 304-p. FIG. 4 shows a sequence diagram of an example installation sequence 400, by which the control container 226 depicted in FIG. 3 may manage the simulator container 302-1 and the plurality of containers 302-2 to 302-n for installing applications on target computing devices 304-1 to 304-p. FIG. 5 shows a process diagram of an example operation 500 of a container depicted in FIG. 3 that may have a plurality of generic functions 208, in which the container 302-1 may generate an input 220 for a function among the plurality of generic functions 208 based on product configuration information 216 and environmental configuration information 218, and may output a log 222 based on execution of the function at a target computing device 304-1 to 304-p. It should be understood that the operation 300 of the control container 226 depicted in FIG. 3, the installation sequence 400 depicted in FIG. 4, and the operation 500 of a container depicted in FIG. 5 may include additional features and that some of the features described herein may be removed and/or modified without departing from the scopes of the operation 300, the installation sequence 400, and the operation 500. The descriptions of the example operation 300 depicted in FIG. 3, the example installation sequence 400 depicted in FIG. 4, and the example operation depicted in FIG. 5 are made with reference to the features of the apparatus 100 and the system 200 respectively depicted in FIGS. 1 and 2 for purposes of illustration.

As indicated by the arrow 308, the processor 102 may download, via the container runtime 204, an image for the control container 226 among the plurality of images 306-1 to 306-m, for instance, the image 306-1. The processor 102 may create the control container 226 in the container runtime 204 based on the downloaded image 306-1, as indicated by the arrow 310. In some examples, the downloaded image 306-1 may include the generic functions 208 and the product configuration information 216 to be used by the control container 226 for the particular installation.

In some examples, the product configuration information 216 for the control container 226 may define other containers needed for the installation. Based on the product configuration information 216 and the generic functions 208, the control container 226 may download images among the plurality of images 306-1 to 306-m correlated to predefined containers to perform various functions of the installation, as indicated by the arrow 312. In some examples, the product configuration information 216 for the control container 226 may identify the images among the plurality of images 306-1 to 306-m to be downloaded for a particular installation.

The control container 226 may execute containers 302-1 to 302-n based on a predefined sequence. By way of particular example and for purposes of illustration, the control container 226 may first create and run a simulator container 302-1. The simulator container 302-1 may establish a connection to a target computing device 304-1 among the target computing devices 304-1 to 304-p to execute the functions to simulate various steps of the installation, as indicated by the arrow 320, Based on results of the simulation, the control container 226 may create and run a plurality of other containers 302-2 to 302-n, which may each establish a connection to the target device 304-1 to perform various steps of the installation, as indicated by the arrow 322. In some examples, the control container 226 may manage the installation of the application based on a predefined sequence, for instance, an installation sequence 400 depicted in FIG. 4.

By way of particular example (now turning to FIG. 4), the controller container 226 may create and run predefined containers based on the installation sequence 400, The controller container 226 may create and run, in a predefined sequence, various containers for particular steps of the installation including, for instance, a simulator container 302-1, a transport container 302-2, an inject container 302-3, a persist container 302-4, a prepare container 302-5, an install container 302-6, an update container 302-7, a migrate container 302-8, an uninstall container 302-9, an integrate container 302-10, a test container 302-11, and/or the like.

The simulator container 302-1 may simulate various steps of the installation prior to performing the installation. For instance, the simulator container 302-1 may check all target computing devices 304-1 to 304-p for certain conditions, based on the generic functions 208 as defined in the product configuration information 216, and may generate the log 222 based on execution of the generic functions 208. In one particular example, the simulator container 302-1 may check a connection to the remote connection server 224 of the target computing devices 304-1 to 304-p, for instance, by determining whether device names, IP addresses, authentication information, and/or the like are correct. In another particular example, the simulator container 302-1 may determine whether the application to be installed or a version of the application is already installed on target computing devices 304-1 to 304-p. In some examples, the processor 102, for instance via the control container 226, may determine whether to proceed to subsequent steps of the installation based on results of the simulation that may be recorded in the log 222.

The transport container 302-2 may prepare the target computing devices 304-1 to 304-p including, for instance, create directories, copy all necessary binaries, or installation software, for installing the application to the target devices 304-1 to 304-p, set user rights to the binaries, and/or the like.

The inject container 302-3 may inject target environment information into templates for use during the installation. The target environment information may include environment variables including, for instance, IP addresses, usernames for installation scripts, and/or the like.

The persist container 302-4 may prepare a database instance at the target computing devices 304-1 to 304-p and may create a schema for the installation. In some examples, the persist container 302-4 may include a predefined set of generic functions 208 that may be used to prepare or install the database instance.

The prepare container 302-5 may prepare the target computing devices 304-1 to 304-p for the installation based on specific application requirements. In some examples, the prepare container 302-5 may create new users at the target computing devices 304-1 to 304-p.

The install container 302-6 may run install commands and may check expected outcomes of the install commands. In some examples, the install container 302-6 may perform a re-do in case of a failure of the install, an undo in case of a persistent failure of the install, and/or the like. An undo function may prevent an unknown state at the target computing devices 304-1 to 304-*p* after a failed install.

The update container 302-7 may run update command and may check expected outcomes of the update commands. In some examples, the update container 302-7 may perform a re-do in case of a failure of the update, an undo in case of a persistent failure of the update, and/or the like. An undo function may prevent an unknown state at the target computing devices 304-1 to 304-*p* after a failed update.

The migrate container 302-8 may run migration commands and may check expected outcomes of the migration commands. In some examples, the migration container 302-8 may perform a re-do in case of a failure of the migration, an undo in case of a persistent failure of the migration, and/or the like. An undo function may prevent an unknown state at the target computing devices 304-1 to 304-*p* after a failed migration.

The uninstall container 302-9 may run uninstall commands and may check expected outcomes of the uninstall commands. In some examples, the uninstall container 302-9 may perform a re-do in case of a failure of the uninstall, an undo in case of a persistent failure, and/or the like. An undo function may prevent an unknown state at the target computing devices 304-1 to 304-*p* after a failed uninstall.

The integrate container 302-10 may register a target computing device 304-1 to 304-*p* in case the target computing device 304-1 to 304-*p* is an agent. The install container 302-10 may integrate the target computing devices 304-1 to 304-*p* into a main application, for instance, at a main computing device or a master server.

The test container 302-11 may test the installation. In some examples, the test container 302-11 may have a predefined set of generic functions 208 to test the installation, for instance, based on the product configuration information for the application.

As indicated by arrow 314 depicted in FIG. 3, the control container 226 may load the environment configuration information 218. The environment configuration information 218 may include attribute information for a particular target computing device 304-1 for the installation among the plurality of target computing devices 304-1 to 304-*p*. In some examples, the environment configuration information 218 may include environment information for each of the plurality of containers 302-1 to 302-*n* to be created by the control container 226.

In some examples, the control container 226 may create the simulator container 302-1, as indicated by the arrow 316, and may create the plurality of other containers 302-2 to 302-*n* to perform other predefined steps of the installation, as indicated by the arrow 318. The simulator container 302-1 and the plurality of containers 302-2 to 302-*n* may be the same as the containers 202-1 to 202-*n* depicted in FIG. 2.

By way of particular example and purposes of illustration, the simulator container 302-1 may execute based on the example operation 500 depicted in FIG. 5. It should be understood that, while the example operation 500 is described with respect to the simulator container 302-1, the example operation 500 may be applicable to any of the plurality of containers 302-2 to 302-*n*.

The simulator container 302-1 may receive product configuration information 216, as indicated by the arrow 502. In some examples, the product configuration information 216 for the simulator container 302-1 may be included in the image correlated to the simulator container 302-1, for instance, the image 306-2.

The simulator container 302-1 may receive environment configuration information 218, as indicated by the arrow 504. In some examples, the environment configuration information 218 for the simulator container 302-1 may be loaded by the control container 226, together with environment configuration information 218 for the control container 226 and the environment configuration information 218 for the plurality of containers 302-2 to 302-*n*.

The simulator container 302-1 may insert values 506 for attributes of the target computing device 304-1 from the environment configuration information 218 to correlated place holders for the attributes in the product configuration information 216. The simulator container 302-1 may generate the input 220 based on a combination of the values 506 for attributes from the environment configuration information 218 and variables from the product configuration information 216.

The simulator container 302-1 may insert the input 220 into correlated ones of the plurality of generic functions 208, which may customize the generic function 208 to the particular installation. In some examples, the generated input 220 may identify a function, such as the correlated function depicted in FIG. 2, among the plurality of generic functions 208. As indicated by the arrow 510, the simulator container 302-1 may establish a connection to the target computing device 304-1 to execute the correlated function 214 at the target computing device 304-1. In some examples, the target computing device 304-1 may initiate a remote execution 326 of the correlated function 214 based on a command received from the simulator container 302-1. In response to the remote execution 326 to execute the correlated function 214, the simulator container 302-1 may receive an output 512 based on the execution of the correlated function 214 from the target computing device 304-1. The simulator container 302-1 may generate the log 222 based on the output 512, as indicated by the arrow 514.

In some examples, the control container 226 may create and run the simulator container 302-1 and each of the plurality of containers 302-2 to 302-*n* in a predefined order, for instance based on the predefined installation sequence 400 depicted in FIG. 4. By way of particular example, the simulator container 302-1 may run first, to establish a connection to the target computing device 304-1 and to simulate steps of the installation, as indicated by the arrow 320. Based on results of the simulation, the control container 226 may create and run the plurality of containers 302-2 to 302-*n* in the predefined order, as indicated by the arrow 322. The plurality of containers 302-2 to 302-*n* may each establish a connection to the target computing device 304-1 to perform their respective functions at the target computing device 304-1.

In some examples, the control container 226 may control the simulator container 302-1 and the plurality of containers 302-2 to 302-*n* to operate in a multi-thread mode, in which the simulator container 302-1 and/or the plurality of containers 302-2 to 302-*n* may simultaneously establish connections to multiple target computing devices 304-1 to 304-*p*. In some examples, the control container 226 may manage multiple installations to be performed simultaneously or in a predefined sequence. In some examples, the control container 226 may create multiple instances of the simulator container 302-1 and the plurality of containers 302-2 to 302-*n*, for instance, for parallel operation.

Figure 6:
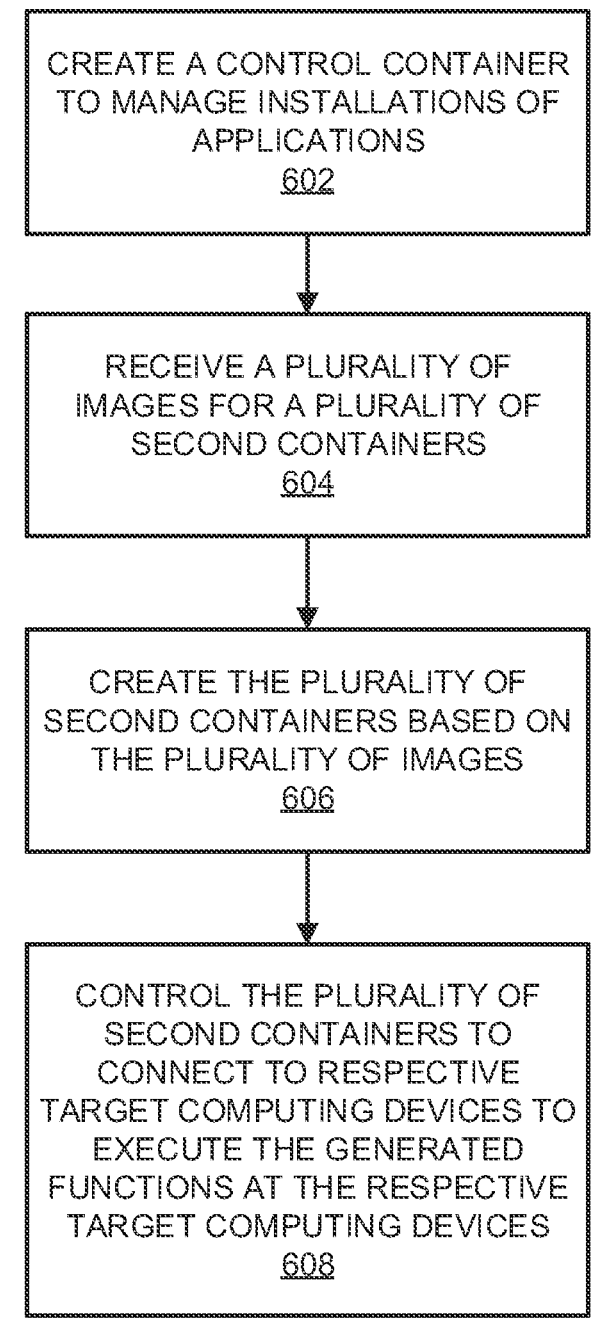
FIG. 6 shows a flow diagram of an example method for creating a control container to manage installations of applications at target computing devices and, via the control container, creating a plurality of second containers to generate functions to perform predefined steps of the installations at the target computing devices.

Various manners in which the processor 102 may operate are discussed in greater detail with respect to the method 600 depicted in FIG. 6. FIG. 6 depicts a flow diagram of an example method 600 for creating a control container 226 to manage installations of applications at target computing devices and, via the control container 226, creating a plurality of second containers to generate functions to perform predefined steps of the installations at the target computing devices. It should be understood that the method 600 depicted in FIG. 6 may include additional operations and that some of the operations described therein may be removed and/or modified without departing from the scope of the method 600. The description of the method 600 is made with reference to the features depicted in FIGS. 1 to 5 for purposes of illustration.

At block 602, the processor 102 may create a control container 226 to manage installations of applications. The control container 226 may be created via the container runtime 204.

At block 604, the processor 102 may receive a plurality of images 206-1 to 206-$m$ for a plurality of second containers, such as the containers 202-1 to 202-$n$ depicted in FIG. 2. In some examples, the control container 226 may identify images among the plurality of images 206-1 to 206-$m$ to be downloaded. The plurality of images 206-1 to 206-$m$ may correlate to predefined steps of the installations, and may be used to create the plurality of second containers 202-1 to 202-$n$ to perform the predefined steps of the installations.

At block 606, the processor 102 may create, via the control container 226, the plurality of second containers 202-1 to 202-$n$ based on the plurality of images 206-1 to 206-$m$. The plurality of second containers 202-1 to 202-$n$ may generate functions, such as the correlated function 214 depicted in FIG. 2, to perform the predefined steps of the installations.

At block 606, the processor 102 may control, via the control container 226, the plurality of second containers 202-1 to 202-$n$ to connect to respective target computing devices 210-1 to 210-$p$ to execute the generated functions 214 at the respective target computing devices 210-1 to 210-$p$.

In some examples, the processor 102 may receive, at the plurality of second containers 202-1 to 202-$n$, configuration information 212 correlated to the installations of applications. In some examples, the plurality of second containers 202-1 to 202-$n$ may include a plurality of generic functions 208. The received configuration information 212 may be correlated to respective functions, such as the correlated function 214, among the plurality of generic functions 208.

In some examples, the processor 102 may generate inputs 220 for the correlated functions 214 based on the received configuration information 212. The correlated functions 214 may execute at the respective target computing devices 210-1 to 210-$p$ based on generated inputs 220. In some examples, based on results of executions of the correlated functions 214 at the respective target computing devices 210-1 to 210-$p$, the processor 102 may output logs 222 of the correlated functions 208.

In some examples, the received configuration information 212 may include product configuration information 216 and environment configuration information 218. The processor 102 may receive the product configuration information 216 based on configurations of the applications. In some examples, the processor 102 may receive the product configuration information 216 via the images 206-1 to 206-$m$ for creating the containers 202-1 to 202-$n$. The processor 102 may receive the environment configuration information 218 based on environments of the respective target computing devices 210-1 to 210-$p$. In some examples, the environment configuration information 218 may include attributes of the respective target computing devices 210-1 to 210-$p$.

In some examples, the processor 102 may select the correlated functions 214 among the plurality of generic functions 208 based on the product configuration information 216 for the installations of the applications. The processor 102 may customize the correlated functions 214 based on the attributes of the respective target computing devices 210-1 to 210-$p$ included in the environment configuration information 218. The processor 102 may insert values for the attributes of the respective target computing devices 210-1 to 210-$p$ from the environment configuration information 218 to correlated placeholders for the attributes in the product configuration information 216 to generate the inputs 220 for the correlated functions 214.

Some or all of the operations set forth in the method 600 may be included as utilities, programs, or subprograms, in any desired computer accessible medium. In addition, the method 600 may be embodied by computer programs, which may exist in a variety of forms both active and inactive. For example, they may exist as machine readable instructions, including source code, object code, executable code or other formats. Any of the above may be embodied on a non-transitory computer-readable storage medium.

Examples of non-transitory computer-readable storage media include computer system RAM, ROM, EPROM, EEPROM, and magnetic or optical disks or tapes. It is therefore to be understood that any electronic apparatus capable of executing the above-described functions may perform those functions enumerated above.

Figure 7:
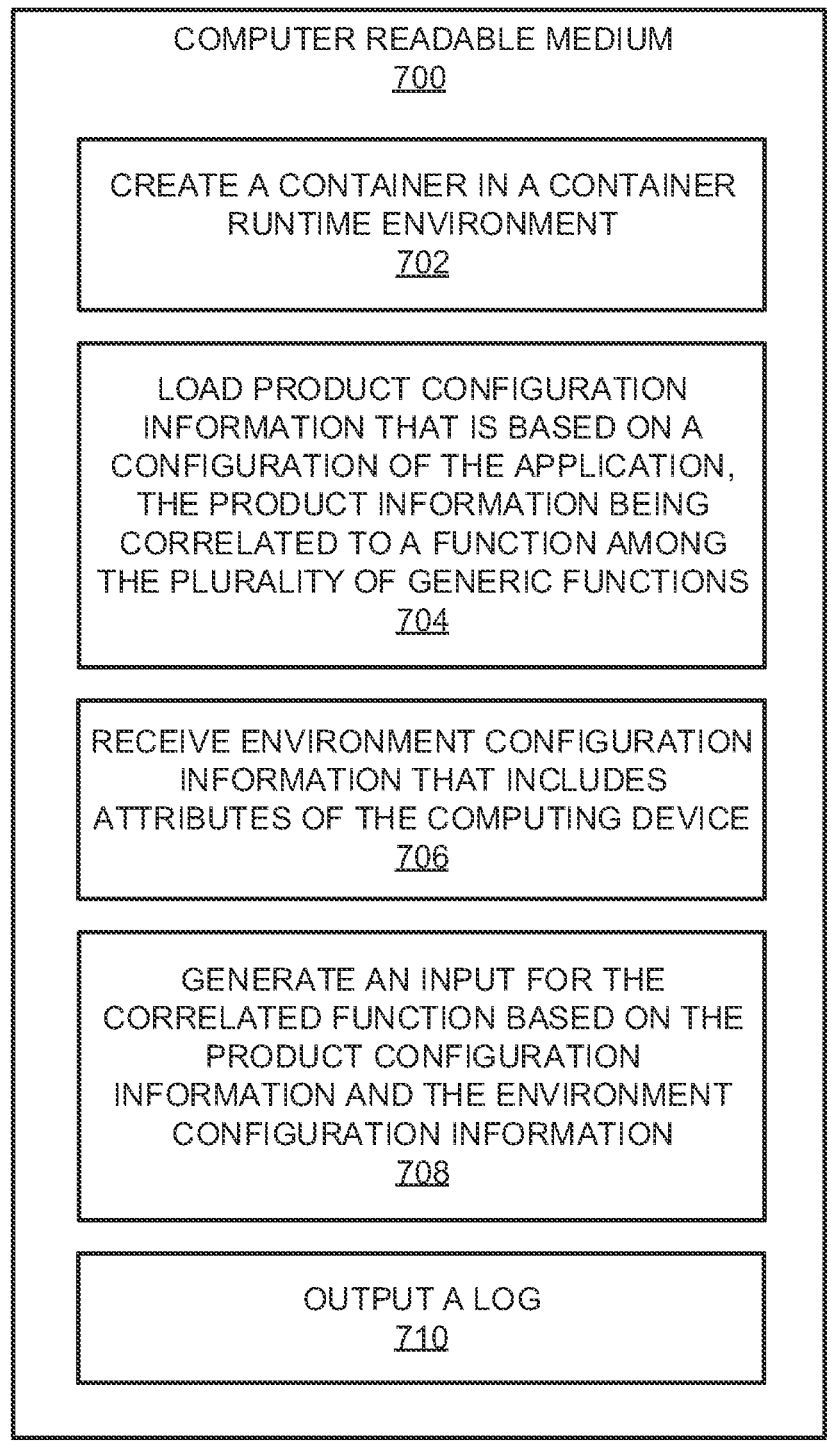
FIG. 7 shows a block diagram of an example non-transitory computer-readable medium that may have stored thereon machine readable instructions to create a container that may include generic functions for installation of an application on a computing device, generate an input for a function among the generic functions based on product configuration information for the application and environment configuration information for the computing device, and output a log based on results of an execution of the function at the computing device.

Turning now to FIG. 7, there is shown a block diagram of an example non-transitory computer-readable medium 700 that may have stored thereon machine readable instructions to create a container 202-1 to 202-$n$ that may include generic functions 208 for installation of an application on a computing device 210-1 to 210-$p$, generate an input 220 for a function among the generic functions 208 based on product configuration information 216 for the application and environment configuration information 218 for the computing device 210-1 to 210-$p$, and output a log 222 based on results of an execution of the function at the computing device 210-1 to 210-$p$. It should be understood that the computer-readable medium 700 depicted in FIG. 7 may include additional instructions and that some of the instructions described herein may be removed and/or modified without departing from the scope of the computer-readable medium 700 disclosed herein. The computer-readable medium 700 may be a non-transitory computer-readable medium. The term "non-transitory" does not encompass transitory propagating signals. The description of the non-transitory computer-readable medium 700 is also made with reference to the features depicted in FIGS. 1 to 5 for purposes of illustration. Particularly, the processor 102 of the apparatus 100 may execute some or all of the instructions 702-710 included in the non-transitory computer-readable medium 700.

The computer-readable medium 700 may have stored thereon machine-readable instructions 702-710 that a processor, such as the processor 102 depicted in FIGS. 1 and 2, may execute. The computer-readable medium 700 may be an electronic, magnetic, optical, or other physical storage device that contains or stores executable instructions. The computer-readable medium 700 may be, for example, RAM, EEPROM, a storage device, an optical disc, or the like.

The processor may fetch, decode, and execute the instructions 702 to create a container 202-1 to 202-$n$ in a container runtime environment, such as the container runtime 204 depicted in FIG. 2. The container 202-1 to 202-$n$ may include a plurality of generic functions 208 for installation of an application on a computing device 210-1 to 210-*p*.

The processor may fetch, decode, and execute the instructions 704 to load product configuration information 216. The product configuration information 216 may be based on a configuration of the application. In some examples, the product configuration information 216 may be correlated to a function 214 among the plurality of generic functions 208.

The processor may fetch, decode, and execute the instructions 706 to receive environment configuration information 218. The environment configuration information 218 may include attributes of the computing device 210-1 to 210-*p*. In some examples, the attributes of the computing device 210-1 to 210-*p* may include a name of the computing device 210-1 to 210-*p*, an Internet Protocol (IP) address of the computing device 210-1 to 210-*p*, authentication information, such as a username and password, hardware configuration, a type of an operating system (OS), an OS version, and/or the like.

The processor may fetch, decode, and execute the instructions 708 to generate an input 220 for the correlated function 214 based on the product configuration information 216 and the environment configuration information 218. The correlated function 214 may be customized for the installation and executed at the computing device 210-1 to 210-*p* based on generated input 220.

The processor may fetch, decode, and execute the instructions 702 to output a log 222 of the correlated function 214 based on results of an execution of the correlated function 214 at the computing device 210-1 to 210-*p*. In some examples, the processor may review the log 222 and may proceed with further steps of the installation based on a successful execution of the correlated function 214.

In some examples, the product configuration information 216 may include information to select and customize the correlated function 214 among the plurality of generic functions 208 based on the application. The environment configuration information 218 may include information to customize the correlated function 214 based on the attributes of the computing device 210-1 to 210-*p*.

In some examples, the processor may insert values for the attributes of the computing device 210-1 to 210-*p* from the environment configuration information 218 to correlated placeholders for the attributes in the product configuration information 216 to generate the input 220 for the correlated function 214.

In some examples, the processor may create a control container 226 to manage operation of a plurality of containers 202-1 to 202-*n* in a multi-thread mode. The plurality of containers 202-1 to 202-*n* may connect to a respective target computing device 210-1 to 210-*p* in parallel in the mufti-thread mode.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration and are not meant as limitations. Many variations are possible within the scope of the disclosure, which is intended to be defined by the following claims— and their equivalents—in which all terms are meant in their broadest reasonable sense unless otherwise indicated.

What is claimed is:

1. An apparatus comprising:
   a processor; and
   a memory on which are stored machine-readable instructions that when executed by the processor, cause the processor to:
      create a container in a container runtime environment, the container comprising a plurality of generic functions for installation of an application on a computing device;
      receive configuration information correlated to the installation of the application, the configuration information being correlated to a function among the plurality of generic functions;
      generate an input for the correlated function based on the configuration information, the correlated function to execute as a portion of the installation of the application on the computing device; and
      install the application on the computing device comprising execution of the correlated function.

2. The apparatus of claim 1, wherein the configuration information comprises:
   a product configuration information that is based on a configuration of the application; and
   an environment configuration information that is based on an environment of the computing device, the environment configuration information including attributes of the computing device.

3. The apparatus of claim 2, wherein the product configuration information includes information to select and customize the correlated function among the plurality of generic functions based on the installation of the application.

4. The apparatus of claim 3, wherein the environment configuration information includes information to customize the correlated function based on the attributes of the computing device.

5. The apparatus of claim 2, wherein the instructions cause the processor to:
   insert values for the attributes of the computing device from the environment configuration information to correlated placeholders for the attributes in the product configuration information to generate the input for the correlated function.

6. The apparatus of claim 2, wherein the attributes of the environment configuration information include a name of the computing device, an Internet Protocol (IP) address of the computing device, authentication information, hardware configuration, operating system (OS), OS version, or a combination thereof.

7. The apparatus of claim 1, wherein the plurality of generic functions included in the container are platform independent, and are customizable for the application and an environment of the computing device based on the received configuration information.

8. The apparatus of claim 1, wherein the instructions cause the processor to:
   create a control container to manage the installation of the application on the computing device, the control container to manage an execution of the container among a plurality of containers, each of the plurality of containers to perform a predefined step among a plurality of predefined steps of the installation of the application on the computing device.

9. The apparatus of claim 8, wherein the plurality of containers to perform a predefined step among a plurality of predefined steps of the installation of the application on the computing device include:
   a simulator container to simulate the installation, an install container to install the application, an uninstall container to uninstall the application, an update container to update the application, a migrate container to migrate the application to another computing device, an integrate container to integrate the computing device to the application, or a combination thereof.

10. The apparatus of claim 8, wherein the control container is to manage operation of the plurality of containers in a multi-thread mode, the plurality of the containers to connect to a respective target computing device in parallel or in a predefined sequence.

11. A method comprising:
creating, by a processor, a control container to manage installations of applications;
receiving, by the processor via the control container, a plurality of images for a plurality of second containers, the plurality of images correlating to predefined steps of the installations;
creating, by the processor via the control container, the plurality of second containers based on the plurality of images, the plurality of second containers to generate functions to perform the predefined steps of the installations; and
controlling, by the processor via the control container, the plurality of second containers to connect to respective target computing devices to execute the generated functions at the respective target computing devices; and
for each second container of the plurality of second containers, installing an application on a computing device comprising execution of a correlated function.

12. The method of claim 11, further comprising:
receiving, at the plurality of second containers, configuration information correlated to the installations of applications, wherein the plurality of second containers include a plurality of generic functions and the received configuration information is correlated to respective functions among the plurality of generic functions;
generating inputs for the correlated respective functions based on the received configuration information, the correlated respective functions to execute at the respective target computing devices based on generated inputs; and
based on results of executions of the correlated respective functions at the respective target computing devices, outputting logs of the correlated respective functions.

13. The method of claim 12, wherein receiving the configuration information includes:
receiving product configuration information based on configurations of the applications; and
receiving environment configuration information based on environments of the respective target computing devices, the environment configuration information including attributes of the respective target computing devices.

14. The method of claim 13, further comprising:
selecting the correlated respective functions among the plurality of generic functions based on the product configuration information for the installations of the applications.

15. The method of claim 13, further comprising:
customizing the correlated respective functions based on the attributes of the respective target computing devices included in the environment configuration information.

16. The method of claim 13, further comprising:
inserting values for the attributes of the respective target computing devices from the environment configuration information to correlated placeholders for the attributes in the product configuration information to generate the inputs for the correlated respective functions.

17. A non-transitory computer-readable medium on which is stored computer-readable instructions that, when executed by a processor, cause the processor to:
create a container in a container runtime environment, the container comprising a plurality of generic functions for installation of an application on a computing device;
load product configuration information that is based on a configuration of the application, the product configuration information being correlated to a function among the plurality of generic functions;
receive environment configuration information that includes attributes of the computing device;
generate an input for the correlated function based on the product configuration information and the environment configuration information, the correlated function to execute as a portion of the installation of the application on the computing device; and;
install the application on the computing device comprising execution of the correlated function.

18. The non-transitory computer-readable medium of claim 17, wherein the product configuration information includes information to select and customize the correlated function among the plurality of generic functions based on the application, and the environment configuration information includes information to customize the correlated function based on the attributes of the computing device.

19. The non-transitory computer-readable medium of claim 17, wherein the instructions cause the processor to:
insert values for the attributes of the computing device from the environment configuration information to correlated placeholders for the attributes in the product configuration information to generate the input for the correlated function.

20. The non-transitory computer-readable medium of claim 17, wherein the instructions cause the processor to:
create a control container to manage operation of a plurality of containers in a multi-thread mode, the plurality of containers to connect to a respective target computing device in parallel in the multi-thread mode.

* * * * *